(12) United States Patent
Matsuyama et al.

(10) Patent No.: US 6,398,582 B1
(45) Date of Patent: Jun. 4, 2002

(54) STRUCTURE FOR FIXING GROMMET TO MOTOR HOUSING AND MOTOR UNIT HAVING SUCH STRUCTURE

(75) Inventors: Youichi Matsuyama, Shinshiro; Wataru Kanou, Toyohashi, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/492,604

(22) Filed: Jan. 27, 2000

(30) Foreign Application Priority Data

Jan. 29, 1999 (JP) .......................... 11-021435

(51) Int. Cl.[7] .............................................. H01R 13/73
(52) U.S. Cl. ................... 439/559; 174/152 G; 439/282
(58) Field of Search .................... 174/153 G, 152 G; 439/556, 559, 282

(56) References Cited

U.S. PATENT DOCUMENTS

| | | | |
|---|---|---|---|
| 3,166,333 A | | 1/1965 | Henley ........................ 277/199 |
| 3,880,487 A | * | 4/1975 | Goodman et al. |
| 4,571,017 A | * | 2/1986 | Fujita |
| 5,487,680 A | | 1/1996 | Yamanashi ................... 439/552 |
| 5,540,450 A | | 7/1996 | Hayashi et al. ............. 277/205 |
| 5,605,468 A | * | 2/1997 | Wood .......................... 439/282 |
| 6,051,794 A | * | 4/2000 | Katou et al. ............ 174/152 G |

FOREIGN PATENT DOCUMENTS

| | | | | |
|---|---|---|---|---|
| JP | 64-88408 | * | 4/1989 | ................... 385/92 |
| JP | A-10-126944 | | 5/1998 | |

* cited by examiner

Primary Examiner—Neil Abrams
(74) Attorney, Agent, or Firm—Law Offices of David G. Posz (57) ABSTRACT

The structure for fixing a grommet to a housing is composed of a housing provided with a connector portion formed at least partly in a column shape, a wire harness connector coupled with the connector portion with a coupling gap and a tubular shaped grommet made of resilient material put on an outside circumferential surface of the connector portion to waterproof seal the coupling gap. The grommet includes a wall with openings that snap over protrusions on the connector portion to rigidly fix them together. The connector portion includes a locking through hole for receiving a latch on the wire harness connector. Seal lips on the grommet are angled downward so as to provide sealing for the locking hole.

25 Claims, 6 Drawing Sheets

STRUCTURE FOR FIXING GROMMET TO MOTOR HOUSING AND MOTOR UNIT HAVING SUCH STRUCTURE

CROSS REFERENCE TO RELATED APPLICATION

This application is based upon and claims the benefit of priority of Japanese Patent Application No. H.11-21435 filed on Jan. 29, 1999, the content of which is incorporated herein by reference.

BACKGROUND OF THE INVENTION

1. Field of the Invention

The present invention relates to a structure for fixing a grommet into a motor housing, in particular, a structure for fixing the grommet for waterproof sealing into a connector portion of the motor housing with which a connector of a wire harness is coupled, and a motor unit having the same structure and applicable to a power window regulator for vehicles.

2. Description of Related Art

A conventional power window regulator for opening/closing a vehicle door glass is composed of a motor unit and a regulator (a link mechanism). The motor unit is provided with a resin molding housing, a DC motor fixed to the housing, reduction gears housed in the housing, a wire harness with a connector coupled with a connector portion of the housing for current supply to the DC motor and a grommet fitted into the connector portion of the housing for waterproof sealing. The motor unit has a waterproof construction for its electrical circuit protection, since water running along the surface of the door window is likely to be entered into the motor unit.

Figure 9:
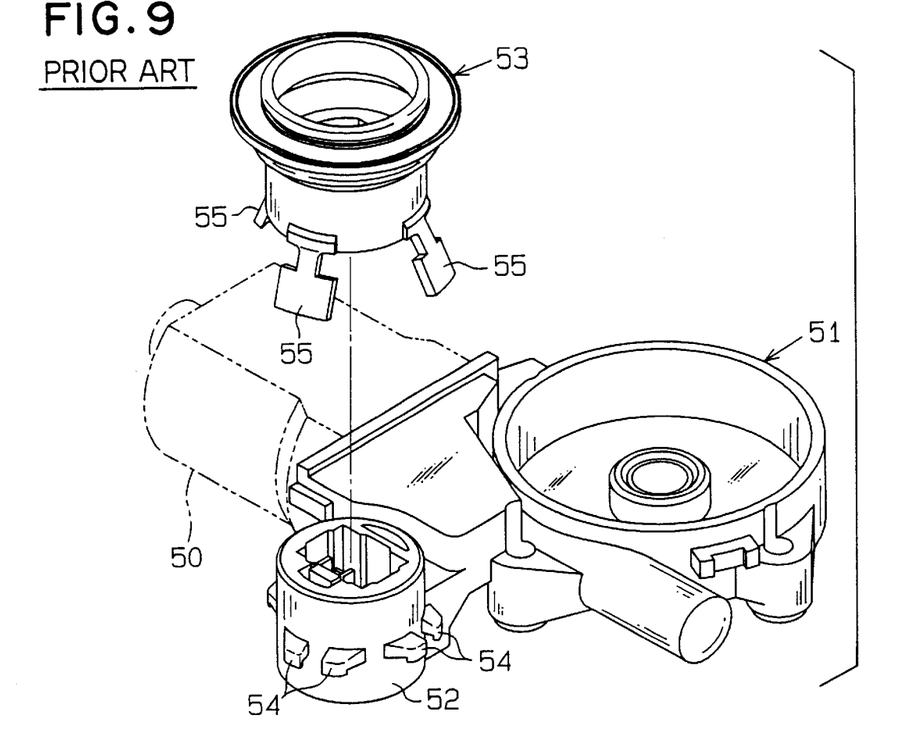
FIG. 9 is a perspective view of a grommet and a connector portion as a prior art.
Figure 10:
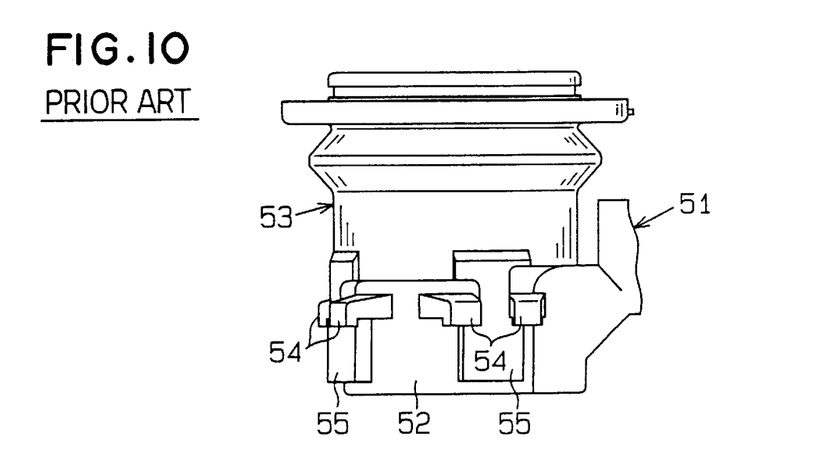
FIG. 10 is an elevation view of the grommet fitted to the connector portion as a prior art.

As shown in FIGS. 9 and 10, the connector portion 52 of the housing 51 is formed in a column shape and the grommet 53 made of elastic rubber is formed in a tubular shape. For preventing water from entering into a coupling gap between the connector of wire harness and the connector portion 52, the grommet 53 is fitted closely into an outside circumferential surface of the connector portion 52.

To rigidly fix the grommet 53 to the connector portion 52, there have been contemplated various ways that, for example, an inside circumferential surface of the grommet 53 and an outside circumferential surface of the connector portion 52 are glued, the grommet 53 is fastened tight from outside by fasteners such as a C-ring and a clip cord to the connector portion 52 after the grommet 53 is put on the connector portion 52, a flange provided at a lower end of the grommet 53 is fastened by screws to a flange provided at a lower end of the connector portion 52 or an inwardly projecting portion of the grommet 53 is fitted into a groove or an undercut provided at a lower portion of the connector portion 52.

However, these ways have such problems that not only more number of component parts or more complicated manufacturing processes are required but also reliability for fixing the grommet 53 to the connector portion 52 is not always sufficient, in particular, in case that these fixing means can not be provided all around circumferences of the connector portion 52 because of a restricted shape of the connector portion 52 integrally provided with the housing 51.

Figure 11:
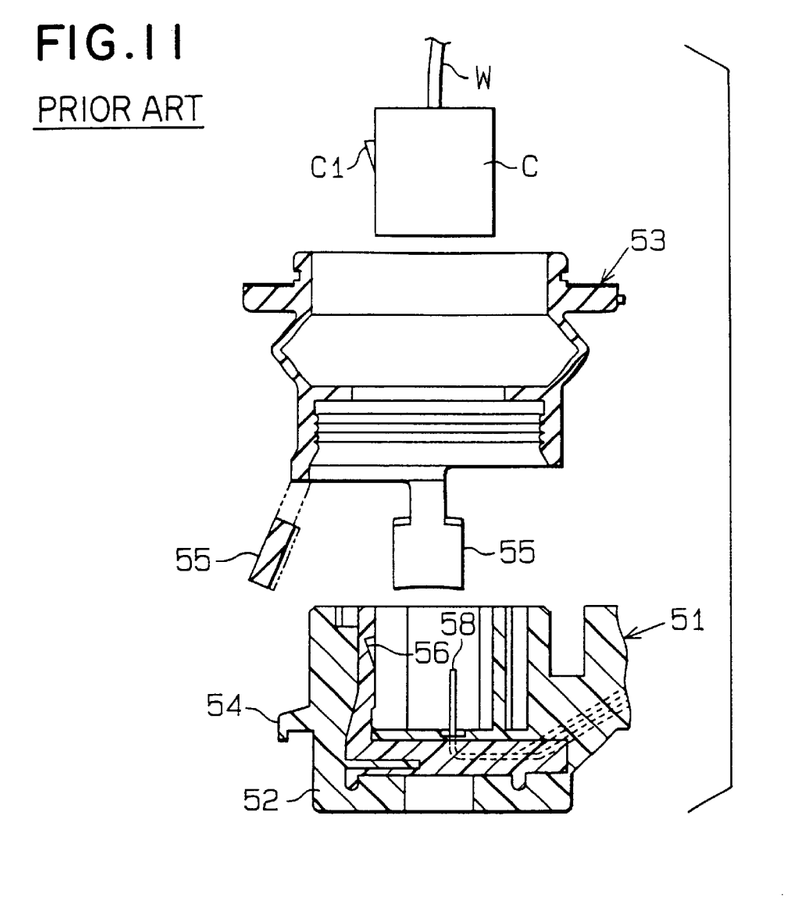
FIG. 11 is a cross sectional view of the grommet to be put on the connector portion as a prior art.

Further, to cope with the problems mentioned above, it has been proposed that, as shown in FIGS. 9, 10 and 11, the connector portion 52 is provided at a lower outside circumferential surface thereof with a plurality of locking claws 54, to which a plurality of resilient locking pieces 55 provided at a lower end of the grommet 53 are respectively latched and fixed. Though this construction improves the fixing reliability, the manufacturing processes for fixing the grommet 53 to the connector portion 52 are still complicated and not suitable for automatic assembly thereof, since, after the grommet 53 is put on the connector portion 52, each of the resilient locking pieces 55 has to be pulled in a lower direction so that the locking pieces 55 may be once deformed resiliently in order to be engaged with each of the locking claws 54 and, then, resiliently returned to the original positions thereof.

Furthermore, as shown in FIG. 11, the connector portion 52 is provided at an inside thereof with a locking concave 56 with which a locking convex C1 of the connector C of the wire harness W is engaged for preventing the connector C from easily being left out the connector portion 52.

Figure 12:
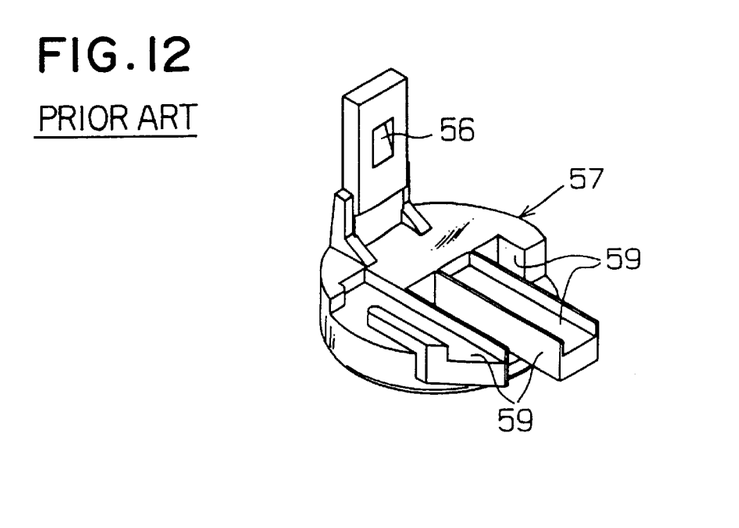
FIG. 12 is a perspective view of a locking member as a prior art.

It is very difficult to form the locking concave 56 at the inside of the connector portion 52 simultaneously when the housing 51 is molded or formed in view of the molding die construction of the connector portion 52. Therefore, to form the locking concave 56, a locking member 57 provided primarily with the locking concave 56 is separately provided as shown in FIG. 12 and, when the housing 51 is molded, the locking member 57 thus separately provided is inserted into the molding die at a position corresponding to the inside of the connector portion 52 as shown in FIG. 11. The locking member 57 also has a plurality of grooves 59 for positioning a plurality of terminals 58 to be also inserted into the molding die when the housing 51 is molded.

The structure mentioned above, however, has a drawback that the locking member 57 is needed as an additional component part and the terminals 58 have to be primarily mounted on the locking member 57 before the locking member 57 is inserted into the die for molding. As a result, a higher manufacturing cost is required, compared with a case that only the terminals 58 are directly inserted into the die for molding.

SUMMARY OF THE INVENTION

The present invention has been made in view of the above mentioned problem, and an object of the present invention is to provide a waterproof sealing structure for easily fixing a grommet to a connector portion with which a wire harness connector is coupled with higher fixing reliability, least number of component parts and/or lower manufacturing cost.

It is an another object to provide a motor unit having the same structure as mentioned above.

To achieve the above object, the structure is composed of a housing provided with a connector portion formed at least partly in a column shape, a wire harness connector coupled with the connector portion with a coupling gap and a tubular shaped grommet made of resilient material put on an outside circumferential surface of the connector portion to waterproof seal the coupling gap. A plurality of locking convex portions are provided respectively with an interval therebetween around the outside circumferential surface of the connector portion. On the other hand, a plurality of concave portions are provided respectively with an interval therebetween around an inside circumferential surface of the grommet. By simply pushing the grommet to put on the connector portion, the grommet is resiliently deformed outwardly at the plurality of the convex portions and, after the grommet passes through the plurality of the convex portions, the grommet outwardly deformed is resiliently returned substantially to an original shape thereof so that the plurality of the concave portions may be engaged respectively with the convex portions to rigidly fix the grommet to the connector portion.

It is preferable that each of the concave portions is a through-hole penetrating radially through the grommet from an inside surface to an outside surface thereof.

Further, in case that the housing is provided with a base unit and a bridging portion connecting the base unit and a part of the circumferential surface of the connector portion, the convex portions are arranged except the outside circumferential surface of the connector portion axially extending from the bridging portion and the grommet is provided with a cut in order not to interfere with the bridging portion when the grommet is put on the connector portion and the concave portions are arranged except the circumferential surface of the grommet axially extending from the cut. In this case, it is preferable that at least a part of the outside circumferential surface of the grommet axially extending from the cut comes in contact with and is inwardly pressed against a surface of the base unit when the grommet is put on the connector portion. As a result, the circumferential surface of the grommet may be rigidly fixed in almost all ranges around the circumferential surface of the connector portion.

Preferably, the grommet is further provided with one or more projections on the outside circumferential surface of the grommet axially extending from the cut. Therefore, the outside circumferential surface of the grommet axially extending from the cut is inwardly pressed through the projections against the surface of the base unit. The projections serve to reduce a friction with the surface of the base unit when the grommet is pushed so as to be put on the connector portion.

Furthermore, it is preferable that a plurality of annular sealing lips are provided at the inside circumferential surface of the grommet. The sealing lips are resiliently deformed to come closely in contact with the outer circumferential surface of the connector portion so that waterproof function may be much more enhanced.

Further, the connector portion is provided with an annular positioning portion and a connector fitting portion axially extending from the annular positioning portion. On the other hand, the grommet is provided with a grommet fitting portion, a guide portion, and a taper shaped annular step portion on an inside thereof and on a boundary between the grommet fitting portion and the guide portion. An inside diameter of the guide portion is slightly larger than an outside diameter of the connector fitting portion. An inside diameter of the fitting portion is slightly smaller than an outside diameter of the connector fitting portion. Therefore, when the grommet is placed at first on the connector portion, the annular step portion is easily positioned, with a help of the guide portion, on the annular positioning portion to align in axial direction the grommet with the connector portion. When the grommet is pushed to the connector portion, the grommet fitting portion is fitted into the connector fitting portion by being resiliently deformed outwardly without disturbing the axial alignment.

The annular positioning portion may be formed in an inclined direction relative to an axis of the connector portion to avoid the interference with the bridging portion. In this case, the annular step portion is also inclined to correspond to the shape of the annular positioning portion.

In case that both of the annular step portion and the annular positioning portion are formed obliquely, it becomes easier to align in axial and angular directions the grommet with the connector portion before the grommet is pushed toward the connector portion for assembly.

It is preferable that the convex portions are arranged on the connector fitting portion and the concave portions are arranged on the guide portion. With the construction above, the concave portions may be engaged respectively with the convex portions simultaneously when the grommet is pushed so as to make the grommet fitting portion fit into the connector fitting portion.

Further, preferably, the sealing lips are arranged on the inside circumferential surface of the grommet fitting portion in parallel with the annular step portion. Therefore, in case that the annular step portion is inclined relative to the axis of the grommet or the connector portion as mentioned above, the sealing lips are also inclined relative to the axis of the grommet or the connector portion so that the grommet fitting portion may be fitted into the connector fitting portion with the least axial travel distance when the grommet is pushed to the connector portion for assembly.

Furthermore, preferably, the connector portion is provided with a locking hole penetrating therethrough perpendicular to the axis of the connector portion and the wire harness connector is provided with a locking convex portion to be engaged with the locking hole for preventing the wire harness connector from being left easily out of the connector portion. An outside of the locking hole is covered with the grommet. It is more preferable that the locking hole is formed to penetrate a circumferential wall of the connector portion on a side opposite to the connector fitting portion with respect to the annular positioning portion. As a result, the penetrating locking hole may be sufficiently sealed without adversely affecting the fitting of the grommet into the connector portion. In case that the annular sealing lips are provided obliquely as mentioned above, there is a sufficient space where the penetrating locking hole may be formed without prolonging the height of the connector portion for securing waterproof sealing.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A preferred embodiment of the present invention is described hereinafter according to FIGS. 1 to 8.

Figure 2:
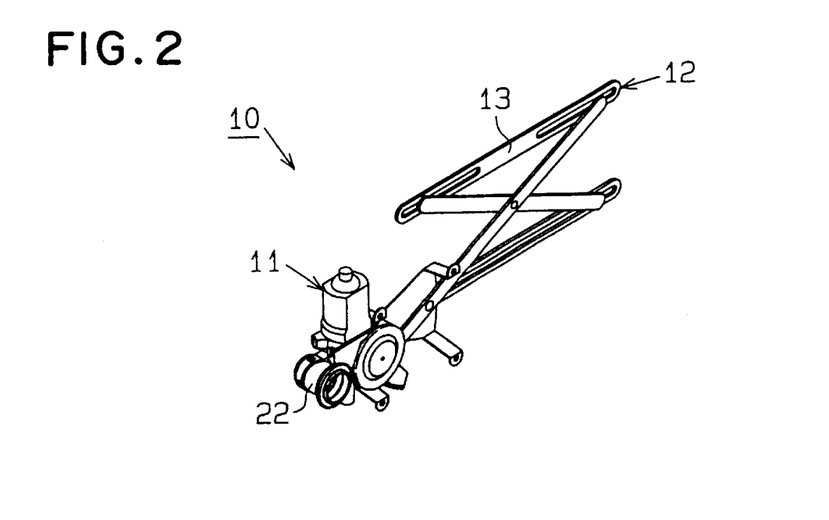
FIG. 2 is a perspective view of a power window regulator for vehicles incorporating the embodiment of the present invention.

FIG. 2 shows a power window regulator for vehicles 10 to be disposed inside a vehicle door for opening or closing a door glass. The power window regulator 10 is composed of a motor unit 11 and a regulator (link mechanism) 12. An upper arm 13 is moved upward or downward according to a rotation of the motor unit 11 in normal or in reverse direction so that the door glass (not shown) fixed to the upper arm 13 may be moved upward or downward.

Figure 1:
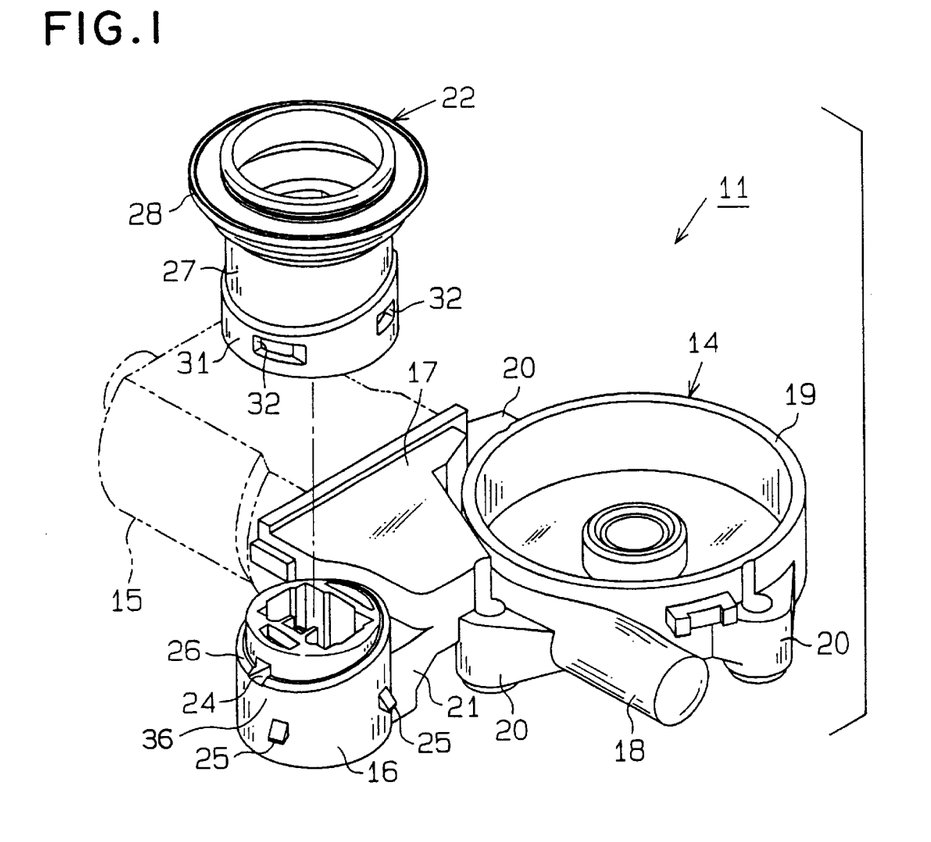
FIG. 1 is a perspective view of a grommet and a connector portion according to an embodiment of the present invention.

As shown in FIG. 1, the motor unit 11 is composed of a housing 14 made of synthetic resin and integrally molded, a DC motor 15 fixed to the housing 14, worm and wheel type reduction gears (not shown) housed in the housing 14, a connector portion 16 integrally formed with the housing, a wire harness W with a connector C (shown in FIG. 5) coupled with the connector portion 16 for current supply to the DC motor 15 and a grommet 22.

The housing 14 is provided, in addition to the connector portion 16, with a base unit 17 for fixing the DC motor 15, a cylindrical portion 18 for housing a worm fixed to a rotational axis (not shown) of the DC motor 15 and a wheel portion 19 for housing a worm wheel (not shown) as an output axis of the motor unit 11. Otherwise, the housing 14 is provided with a plurality of through-holes (20) for fixing the motor unit 11 to the vehicle door by bolts.

The connector portion 16, as shown in FIG. 1, is formed nearly in a column shape as an appearance thereof and located on a side opposite to the wheel portion 19 with respect to the cylindrical portion 18. A center axis of the connector portion 16 is nearly in parallel with a center axis of the worm wheel and a height of the connection portion 16 in an axial direction is nearly equal to a thickness of the wheel portion 19 in an axial direction. The housing 14 is also provided with a bridging portion 21 for connecting the connector portion 16 and the base unit 17. The height of the bridging portion 21 in an axial direction of the connector portion 16 is lower than the height of the connector portion 16.

Figure 3:
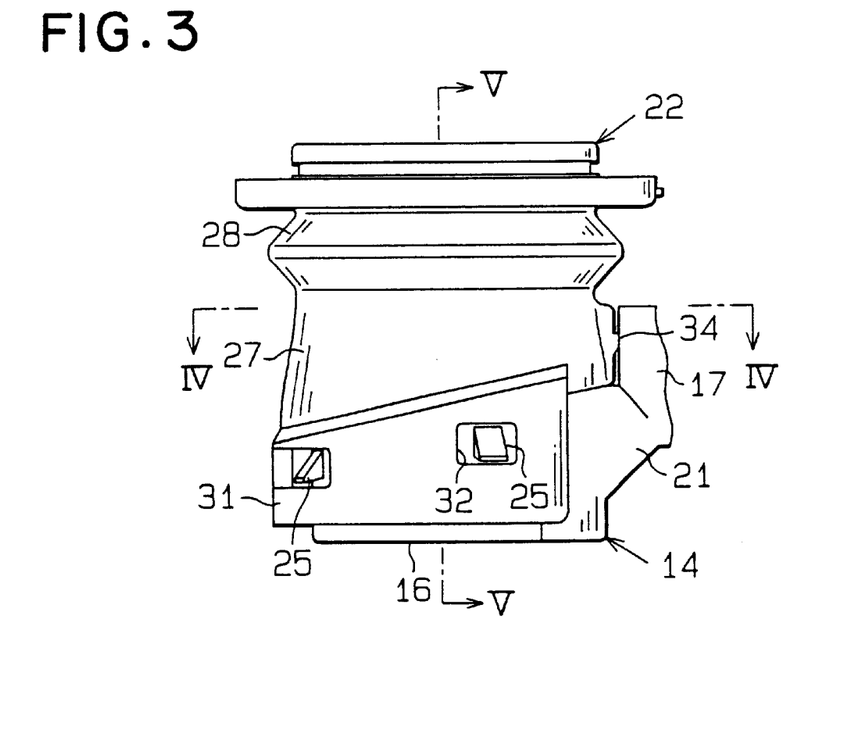
FIG. 3 is an elevation view of the grommet fitted to the connector portion.

The grommet 22 is of a tubular shape and made of integrally formed elastic (resilient) material such as rubber for waterproof sealing a connector coupling gap formed by coupling the wire harness connector C with the connector portion 16 as shown in FIG. 3.

Figure 4:
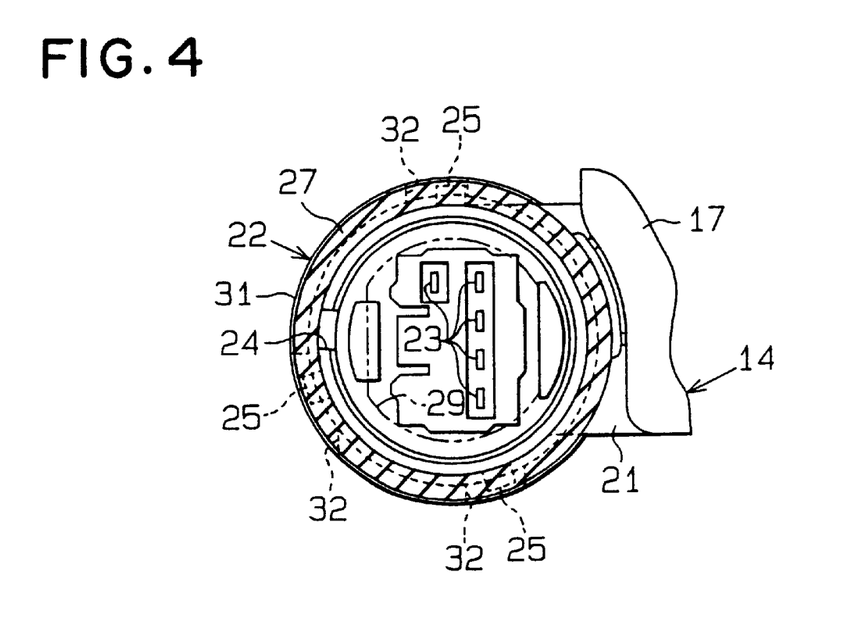
FIG. 4 is a cross sectional view taken along a line IV—IV of FIG. 3.
Figure 5:
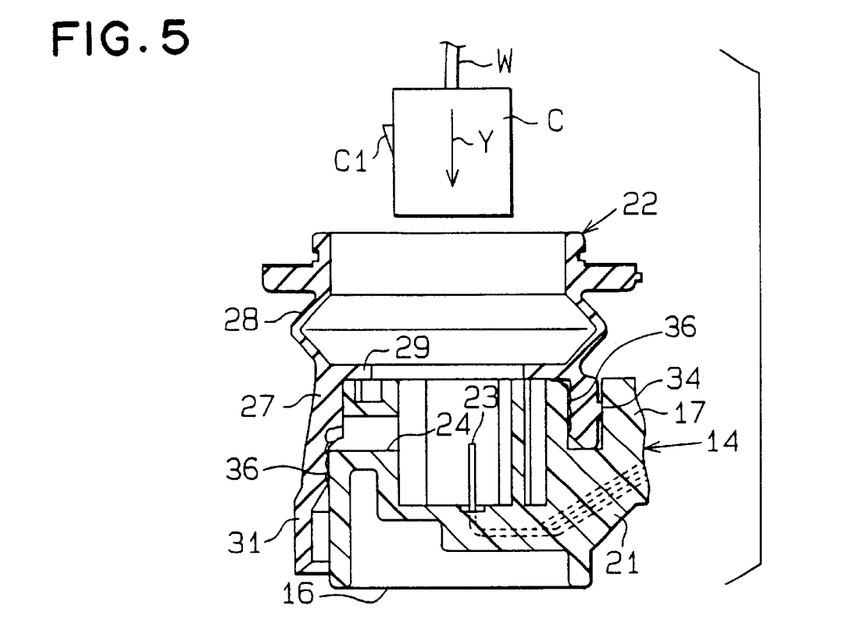
FIG. 5 is a cross sectional view taken along a line V—V of FIG. 3.

As shown FIGS. 4 and 5, the connector portion 16 is provided inside thereof with terminals 23 for lead wires connecting the DC motor 15 and signal wires for sensors such as a rotation sensor (hall-effect device) disposed in the housing 14. Each of the terminals 23 is embedded in the housing 14 in such a manner that the housing 14 is molded by inserting the terminals 23 to a molding die.

As shown in FIG. 5, the connector portion is provided with a locking hole 24 formed perpendicular to a coupling direction of the wire harness connector C (in a direction shown by an arrow Y in FIG. 5) for engaging and locking with a locking convex portion C1 of the wire harness connector C. The housing 14 is molded by cutting dies separable in a coupling direction of the connector portion 16 and the locking hole 24 is formed by drawing back a core piece separately provided in the cutting dies perpendicular to a separating direction of the cutting dies simultaneously when the housing 14 is molded. The locking hole 24 can be integrally molded with housing 14 without such an inserting molding as the conventional locking concave 56 is formed. The locking hole 24 is located on a circumferential surface of the connector portion on a side opposite to the bridging portion 21.

Figure 8A:
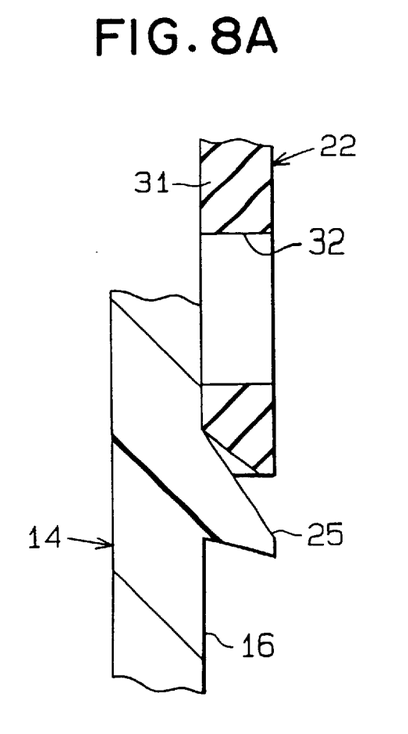
FIG. 8A is a cross sectional schematic view of locking concave and convex portions before engagement.
Figure 8B:
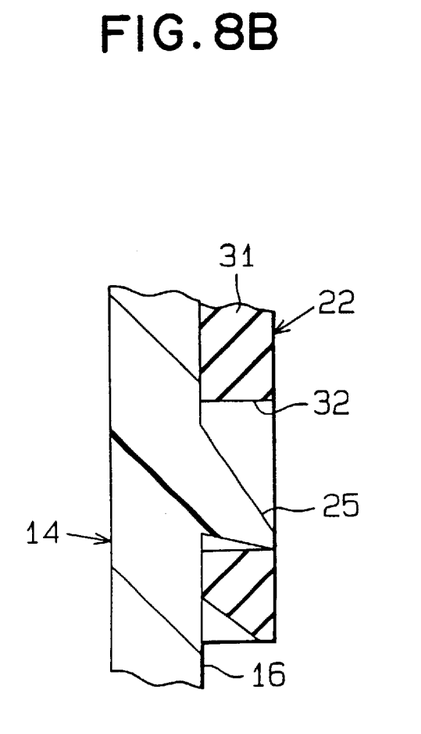
FIG. 8B is a cross sectional schematic view of locking concave and convex portions after engagement.

As shown in FIGS. 1, 3 and 4, a plurality of locking convex portions 25 are arranged on an outside circumferential surface of a connector fitting portion 36 of the connector portion 16 with a certain interval therebetween. Each of the locking convex portions 25 is formed, as shown in FIGS. 8A and 8B, in a tapered shape at least on a front side thereof (wire harness connector C side) that an outwardly protruding length thereof is shorter on a side of the wire harness connector C than that on a side opposite to the wire harness connector C. This tapered shape causes the grommet 22 to slidably move for fitting the grommet 22 easily into the connector portion 16.

As shown in FIG. 1, an annular positioning portion 26 is formed on the outside circumferential surface of the connector portion 16. The annular positioning portion 26 is formed obliquely in a coupling direction of the connector portion 16, that is, the lowest in height on a side of the locking hole 24 and the highest in height on a side of the bridging portion 21. The connector fitting portion 36 is an outside circumferencial surface of the connector portion 16 extending axially from the annual positioning portion 26.

Figure 6:
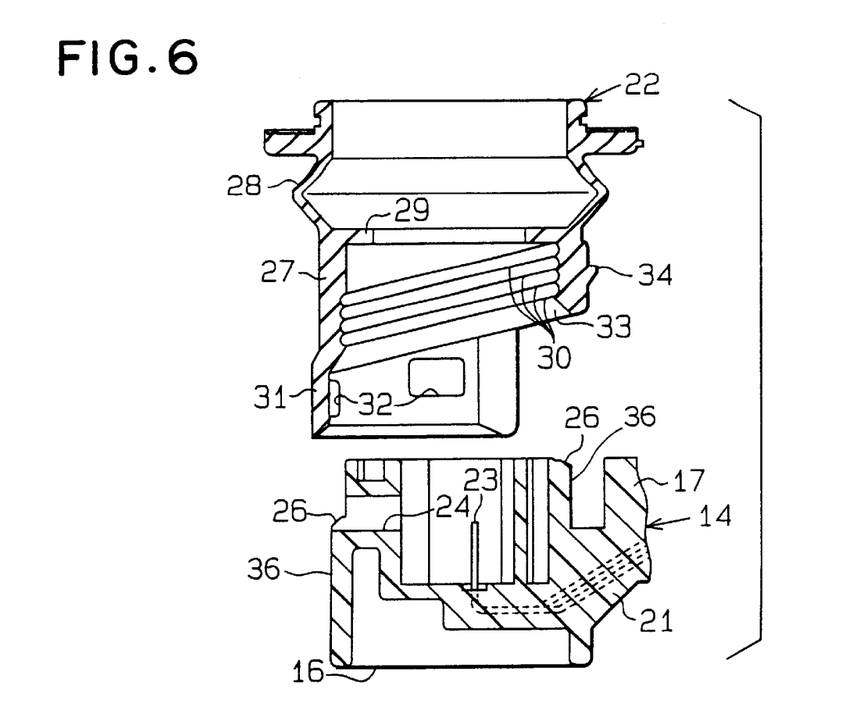
FIG. 6 is a cross sectional view of the grommet to be put on the connector portion.
Figure 7:
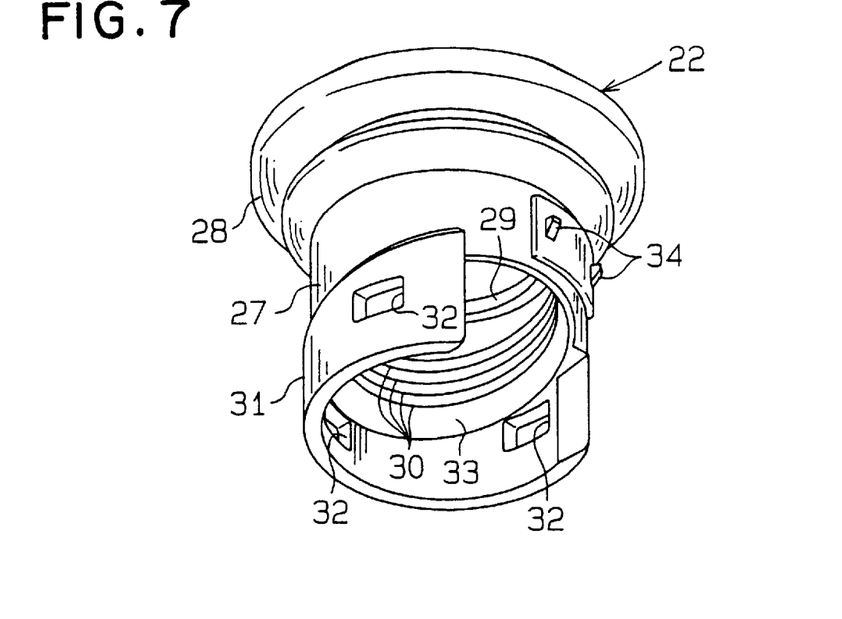
FIG. 7 is a perspective view from a lower side of the grommet.

The grommet 22 has, as shown in FIGS. 6 and 7, a grommet fitting portion 27 for fitting into the connector portion 16, a sealing portion 28 for sealing the wire harness connector side and a guide portion 31 for guiding properly the grommet 22 when the grommet 22 is simply pushed so as to be put on the connector portion 16. Inside the grommet 22, an inwardly protruding stopper 29 is provided between the fitting portion 27 and the sealing portion 28. The stopper 29 serves to locate the grommet 22 at a predetermined axial position in a manner that the stopper 29 comes in contact with the leading end of the connector portion 16 when the grommet 22 is put on the connector portion 16.

The guide portion 31 is provided with a cut at a position corresponding to the bridging portion 21 to avoid an interference with the bridging portion 21 and a plurality of locking concave portions 32 (through-holes) with a certain interval therebetween with which the locking convex portions 25 are respectively engaged and locked. Instead of the through-holes mentioned above, each of the locking concave portions 32 may be a hollow provided only on an inside surface of the guide portion 31 not to be penetrated to an outside surface thereof. When the locking convex portions 25 completely fit into the locking concave portions 32, respectively, as shown in FIG. 8B, the grommet 22 is rigidly fixed to the connector portion 16.

Further, inside the grommet 22, a taper shaped annular step portion 33 is provided at a boundary between the grommet fitting portion 27 and the guide portion 31. An inside diameter of the guide portion 31 is slightly larger than an outside diameter of the connector fitting portion 36. An inside diameter of the grommet fitting portion 27 is slightly smaller than an outside diameter of the connector fitting portion 36.

The annular taper shaped step portion 33 is provided obliquely in an axial direction of the grommet 22 and comes closely in contact with the annular positioning portion 26 when the grommet 22 is placed on the connector portion 16 so that the guide portion 31 may be nearly fitted into the connector fitting portion 36 without resiliently deforming. As a result, the grommet 22 can be easily aligned in axial and angular directions relative to the connector portion 16, that is, a center axis of the grommet 22 is aligned in parallel with the coupling direction of the connector portion 16 and an angular position of the grommet 22 coincides with that of the connector portion 16.

A plurality of sealing lips 30 are formed obliquely on an inside circumferential surface of the fitting portion 27 in parallel with the annular taper shaped step portion 33. Therefore, the grommet fitting portion 27 may be fitted into the connector fitting portion 36 with the least axial travel distance when the grommet 22 is pushed toward the connector portion 26. Further, as the sealing lips 30 is obliquely provided, the locking hole 24 penetrating a circumferential wall of the connector portion 26 can be located at a space on a side opposite to the connector fitting portion 36 with respect to the annular positioning portion 26. As a result, the locking hole 24 may be sufficiently sealed by the grommet 22 without prolonging the height of the connector portion 16 for securing waterproof sealing.

As shown in FIG. 7, a plurality of projections 34 is provided with an interval therebetween on the outside surface of the grommet fitting portion 27 axially extending from the cut where the locking concave portions 32 are not provided. The projections 34 come in contact and are inwardly pressed against a surface of the base unit 17 of the housing 14, as shown in FIGS. 3, 4 and 5, so that the inside circumferential surface of the grommet fitting portion 27 may be rigidly fixed to the outside circumferential surface of the connector fitting portion 36.

Each of the projections 34 is formed in such a shape that an area where the projection 34 comes in contact with the surface of the base unit 17 is as small as possible. This is for reducing a friction with the surface of the base unit 17 when the grommet 22 is pushed so as to be put on the connector portion 16. Therefore, the circumferential surface of the grommet 22 can be rigidly fixed all around the circumference of the connector portion 16 with a locking engagement by the locking concave and convex portions 32 and 25 and a frictional engagement by the projections 34 and the base unit 17.

However, when a space between the base unit 17 and the connector portion 16 is narrower, that is, when the bridging portion 21 is shorter, the projections 34 may be eliminated. Instead, a part of the grommet fitting portion 27 axially extending from the cut may be pushed into the space. With the construction mentioned above, the waterproof fitting of the grommet 22 into the connector portion 16 is more enhanced, though the friction with the base unit 17 becomes larger because of no projections 34.

The present invention is applicable not only to the motor unit 11 for the power window regulator mentioned above but also to an any type of motor unit, for example, for a sun roof control or for a retractable headlight control. The motor 15 is not limited to the DC motor but may be an any type of motor including a brushless motor or a stepping motor.

What is claimed is:

1. A construction for waterproof sealing a connector coupling gap comprising:
   a housing;
   a connector portion provided integrally with the housing and formed at least partly in a column shape;
   a wire harness connector coupled with the connector portion with a coupling gap;
   a tubular shaped grommet made of resilient material and put on an outside circumferential surface of the connector portion to seal the connector coupling gap;
   a plurality of locking convex portions provided spaced around the outside circumferential surface of the connector portion; and
   a plurality of locking concave portions provided spaced around an inside circumferential surface of the grommet,
   wherein, at least at the plurality of the convex portions, the grommet is resiliently outwardly deformable when the grommet is pushed onto the connector portion and resiliently returnable to a pre-outwardly deformable state when the plurality of the locking concave portions are completely inserted into the locking convex portions respectively so that the grommet may be rigidly fixed to the connector portion,
   wherein the housing is provided with a base unit and a bridging portion connecting the base unit and a part of the circumferential surface of the connector portion, the locking convex portions are arranged on the connector portion except for the outside circumferential surface of the connector portion axially extending from the bridging portion, the grommet is provided with a cut to prevent interference with the bridging portion when the grommet is placed on the connector portion and the locking concave portions are arranged around the connector portion except for the inside circumferential surface of the grommet axially extending from the cut and, further,
   wherein at least a part of the outside circumferential surface of the grommet axially extending from the cut contacts with and is inwardly pressed against a surface of the base unit when the grommet is placed on the connector portion so that the circumferential surface of the grommet is rigidly fixed around a substantial percentage of the circumference of the connector portion.

2. A construction according to claim 1, wherein each of the locking concave portions is a through-hole penetrating radially through the grommet from an inside surface to an outside surface thereof.

3. A construction according to claim 1, further comprising; at least a projection provided on the outside circumferential surface of the grommet axially extending from the cut, wherein the outside circumferential surface of the grommet axially extending from the cut is inwardly pressed through the projection against the surface of the base unit.

4. A construction according to claim 1, further comprising:
   a plurality of annular sealing lips provided on the inside circumferential surface of the grommet, wherein the sealing lips are resiliently deformed to come closely in contact with the outer circumferential surface of the connector portion so that waterproof function may be much more enhanced.

5. A construction according to claim 1, wherein the connector portion is provided with an annular positioning portion and a connector fitting portion axially extending from the annular positioning portion, the locking convex portions being arranged on the connector fitting portion, and, further, wherein the grommet is provided with a grommet fitting portion, a guide portion, and a taper shaped annular step portion on an inside thereof and on a boundary between the fitting portion and the guide portion, the locking concave portions being arranged on the guide portion, an inside diameter of the guide portion being slightly larger than an outside diameter of the connector fitting portion and an inside diameter of the grommet fitting portion being slightly smaller than an outside diameter of the connector fitting portion and, whereby, when the grommet is placed at first on the connector portion, the annular step portion is primarily positioned on the annular positioning portion to align axially the grommet with the connector portion and, when the grommet is pushed to the connector portion, the grommet fitting portion is fitted to the connector fitting portion by being resiliently deformed outwardly without disturbing the axial alignment, while the locking concave portions are respectively engaged with the locking convex portions.

6. A construction according to claim 5, wherein the annular positioning portion is formed in an inclined direction relative to an axis of the connector portion and the annular step portion is also formed to correspond to the annular positioning portion.

7. A construction according to claim 5, wherein a plurality of sealing lips are arranged on the inside circumferential surface of the grommet fitting portion and in parallel with the annular step portion.

8. A construction according to claim 1, further comprising:
   a locking hole provided at the connector portion so as to penetrate through the connector portion perpendicular to the axis of the connector portion; and
   a locking convex portion provided at the wire harness connector, the locking convex portion being engaged with the locking hole for preventing the wire harness connector from being left easily out of the connector portion,
   wherein an outside of the locking hole is covered with the grommet.

9. A construction according to claim 7, further comprising; a locking hole provided at the connector portion on a side opposite to the connector fitting portion with respect to the annular positioning portion so as to penetrate through the connector portion perpendicular to the axis of the connector portion; and
   a locking convex portion provided at the wire harness connector, the locking convex portion being engaged with the locking hole for preventing the wire harness connector from being left easily out of the connector portion,
   wherein an outside of the locking hole is covered with the grommet fitting portion.

10. A motor unit having a construction for waterproof sealing a connector coupling gap comprising:
    a housing;
    a motor mounted on the housing;
    a connector portion provided integrally with the housing and formed at least partly in a column shape, the connector portion being connected in circuit with the motor;
    a wire harness connector coupled with the connector portion with a coupling gap to supply a current to the motor;
    a tubular shaped grommet made of resilient material and put on an outside circumferential surface of the connector portion to seal the connector coupling gap;
    a plurality of locking convex portions provided spaced around the outside circumferential surface of the connector portion;
    a plurality of locking concave portions provided spaced around an inside circumferential surface of the grommet,
    wherein, at least at the plurality of the convex portions, the grommet is resiliently outwardly deformable when the grommet is pushed onto the connector portion and resiliently returnable to a pre-outwardly deformable state when the plurality of the locking concave portions are completely inserted into the locking convex portions respectively, the grommet is resiliently returned substantially to a state before the grommet runs onto the locking convex portions so that the grommet may be rigidly fixed to the connector portion,
    wherein the housing is provided with a base unit and a bridging portion connecting the base unit and a part of the circumferential surface of the connector portion, the locking convex portions are arranged on the connector portion except for the outside circumferential surface of the connector portion axially extending from the bridging portion, the grommet is provided with a cut to prevent interference with the bridging portion when the grommet is placed on the connector portion and the locking concave portions are arranged around the connector portion except for the inside circumferential surface of the grommet axially extending from the cut and, further,
    wherein at least a part of the outside circumferential surface of the grommet axially extending from the cut contacts and is inwardly pressed against a surface of the base unit when the grommet is placed on the connector portion so that the circumferential surface of the grommet may be rigidly fixed around a substantial percentage of the circumference of the connector portion.

11. A construction according to claim 10, wherein each of the locking concave portions is a through-hole penetrating radially through the grommet from an inside surface to an outside surface thereof.

12. A construction according to claim 10, further comprising:
    at least a projection provided on the outside circumferential surface of the grommet axially extending from the cut, wherein the outside circumferential surface of the grommet axially extending from the cut is inwardly pressed through the projection against the surface of the base unit.

13. A construction according to claim 10, further comprising:
    a plurality of annular sealing lips provided on the inside circumferential surface of the grommet, wherein the sealing lips are resiliently deformed to come closely in contact with the outer circumferential surface of the connector portion so that waterproof function may be much more enhanced.

14. A construction according to claim 10, wherein the connector portion is provided with an annular positioning portion and a connector fitting portion axially extending from the annular positioning portion, the locking convex portions being arranged on the connector fitting portion, and, further, wherein the grommet is provided with a grommet fitting portion, a guide portion, and a taper shaped annular step portion on an inside thereof and on a boundary between the fitting portion and the guide portion, the locking concave portions being arranged on the guide portion, an inside diameter of the guide portion being slightly larger than an outside diameter of the connector fitting portion and an inside diameter of the grommet fitting portion being slightly smaller than an outside diameter of the connector fitting portion and, whereby, when the grommet is placed at first on the connector portion, the annular step portion is primarily positioned on the annular positioning portion to align axially the grommet with the connector portion and, when the grommet is pushed to the connector portion, the grommet fitting portion is fitted to the connector fitting portion by being resiliently deformed outwardly without disturbing the axial alignment, while the locking concave portions are respectively engaged with the locking convex portions.

15. A construction according to claim 14, wherein the annular positioning portion is formed in an inclined direction relative to an axis of the connector portion and the annular step portion is also formed to correspond to the annular positioning portion.

16. A construction according to claim 14, wherein a plurality of sealing lips are arranged on the inside circumferential surface of the grommet fitting portion and in parallel with the annular step portion.

17. A construction according to claim 10, further comprising:

locking hole provided at the connector portion so as to penetrate through the connector portion perpendicular to the axis of the connector portion; and a locking convex portion provided at the wire harness connector, the locking convex portion being engaged with the locking hole for preventing the wire harness connector from being left easily out of the connector portion, wherein an outside of the locking hole is covered with the grommet.

18. A construction according to claim 16, further comprising:

a locking hole provided at the connector portion on a side opposite to the connector fitting portion with respect to the annular positioning portion so as to penetrate through the connector portion perpendicularly to the axis of the connector portion; and a locking convex portion provided at the wire harness connector, the locking convex portion being engaged with the locking hole for preventing the wire harness connector from being left out of the connector portion, wherein an outside of the locking hole is covered with the grommet fitting portion.

19. A motor unit having a construction for providing a waterproof seal for a connector coupling gap comprising:

a housing;

a motor mounted on the housing;

a connector portion provided integrally with the housing and formed at least partly in a column shape, the connector portion being connected in circuit with the motor and being provided with a plurality of locking convex portions spaced at given intervals around an outside surface thereof;

a wire harness connector coupled with the connector portion with a coupling gap to supply current to the motor;

a tubular shaped grommet made of a resilient material and placed on the outside circumferential surface of the connector portion to seal the connector coupling gap, the tubular shaped grommet being provided at an inside circumferential surface thereof between opposite axial ends with an inwardly protruding annular stopper and at the inside circumferential surface of the tubular shaped grommet between the stopper and one of the opposite axial ends with a plurality of locking concave portions circumferentially spaced at given intervals around the inside circumferential surface thereof; and wherein, at least at the plurality of the convex portions, the grommet is resiliently outwardly deformable when the grommet is pushed onto the connector portion and resiliently returnable to a pre-outwardly deformable state when the plurality of the locking concave portions are completely inserted into the locking convex portions respectively, the grommet is resiliently returned substantially to a state before the grommet runs onto the locking convex portions so that the grommet may be rigidly fixed to the connector portion.

20. A construction according to claim 19, wherein the housing is provided with a base unit and a bridging portion connecting the base unit and a part of the circumferential surface of the connector portion, the grommet is provided with a cut in order not to interfere with the bridging portion when the grommet is put on the connector portion and, further, wherein at least a part of the outside circumferential surface of the grommet axially extending from the cut comes in contact with and is inwardly pressed against a surface of the base unit when the grommet is put on the connector portion so that the circumferential surface of the grommet may be rigidly fixed substantially all around the circumference of the connector portion.

21. A construction according to claim 20, further comprising;

at least one projection provided on the outside circumferential surface of the grommet axially extending from the cut, wherein the outside circumferential surface of the grommet axially extending from the cut is inwardly pressed through the projection against the surface of the base unit.

22. A construction according to claim 19, further comprising:

a plurality of annular sealing lips provided on the inside circumferential surface of the grommet, wherein the sealing lips are resiliently deformed to come closely in contact with the outer circumferential surface of the connector portion so that a waterproof function is enhanced.

23. A construction according to claim 19, wherein the connector portion includes a plurality of terminals for connecting the connector portion in circuit with the motor.

24. A construction according to claim 19, wherein each of the locking concave portions comprises a through-hole and each of the locking convex portions comprises a taper shaped protrusion.

25. A construction according to claim 19, wherein each of the locking concave portions comprises an indentation on the inside circumferential surface of the tubular shaped grommet.

* * * * *